United States Patent [19]
Tamura et al.

[11] Patent Number: 6,096,814
[45] Date of Patent: Aug. 1, 2000

[54] FLEXIBLE POLYPROPYLENE RESIN COMPOSITIONS, FILMS OR SHEETS MADE THEREFROM, AND SURFACE-PROTECTIVE FILMS OR SHEETS MADE THEREFROM

[75] Inventors: Satoshi Tamura; Yutaka Azuma, both of Ichihara, Japan

[73] Assignee: Idemitsu Petrochemical Co., Ltd., Tokyo, Japan

[21] Appl. No.: 09/147,638

[22] PCT Filed: Aug. 4, 1997

[86] PCT No.: PCT/JP97/02704

§ 371 Date: Feb. 5, 1999

§ 102(e) Date: Feb. 5, 1999

[87] PCT Pub. No.: WO98/05714

PCT Pub. Date: Feb. 12, 1998

[30] Foreign Application Priority Data

Aug. 6, 1996 [JP] Japan ................................. 8-206742
Oct. 23, 1996 [JP] Japan ................................. 8-280680

[51] Int. Cl.$^7$ ............................. C08L 23/10; C08K 5/17; C08J 5/18; C09J 7/02
[52] U.S. Cl. ............................. 524/232; 526/72; 526/351; 428/343
[58] Field of Search ..................... 428/515, 516, 428/343; 526/72, 351; 524/232

[56] References Cited

U.S. PATENT DOCUMENTS 5,216,056 6/1993 Suhoza ..................................... 524/202
5,955,524 9/1999 Azuma et al. ........................... 524/178

OTHER PUBLICATIONS

06263934 A JP Abstract, Sep. 1994.
3–168224 A J.P. Abstract, Jul. 1991.
0721631 A J.P. Abstract, Aug. 1995.

*Primary Examiner*—Daniel Zirker
*Attorney, Agent, or Firm*—Oblon, Spivak, McClelland, Maier & Neustadt, P.C.

[57] ABSTRACT

(1) Provided is a flexible polypropylene resin composition comprising 100 parts by weight of a flexible polypropylene resin having (a) a peak melting temperature of 150° C. or above as measured through differential scanning calorimetry and (b) a tensile modulus of elasticity of from 200 to 700 MPa, and from 0.05 to 5 parts by weight of a hindered amine light stabilizer. The flexible polypropylene resin preferably comprises (A) from 20 to 100% by weight of a propylene homopolymer having (c) a pentad fraction, $rrrr/(1-mmmm) \times 100$, as measured through isotopic carbon nuclear magnetic resonance spectrometry ($^{13}$C-NMR) of from 20 to 60%, and (d) a melting enthalpy as measured through differential scanning calorimetry of from 10 to 100 J/g, and/or a propylene copolymer containing at most 4% by weight of other olefin units and having the physical data of (c) and (d), and (B) from 0 to 80% by weight of a propylene copolymer containing from 10 to 80% by weight of non-propylene olefin units.

(2) The flexible polypropylene resin composition (1) may contain from 0.05 to 5 parts by weight, relative to 100 parts by weight of the flexible polypropylene resin, of a benzotriazole ultraviolet absorbent.

(3) Also provided is a film or sheet of the resin composition of (1) or (2).

10 Claims, No Drawings

FLEXIBLE POLYPROPYLENE RESIN COMPOSITIONS, FILMS OR SHEETS MADE THEREFROM, AND SURFACE-PROTECTIVE FILMS OR SHEETS MADE THEREFROM

BACKGROUND OF THE INVENTION

1. Field of the Invention

The present invention relates to flexible polypropylene resin compositions with good weather resistance for use in surface protection, and to films or sheets made from them.

2. Description of the Background

Heretofore, vinyl chloride-based resins have been used for surface-protective films for construction materials, furniture, etc. However, because of the problems with the resins in that the plasticizer in them is toxic and that they generate toxic gas when their wastes are incinerated, the resins are being substituted with polyolefin resins.

Surface-protective films or sheets of polyolefin resins are known, for example, in Japanese Patent Application Laid-Open (JP-A) Hei-5-92514 in which is disclosed a technique of adding a hindered amine light stabilizer (hereinafter referred to as HALS) singly or as combined with an ultraviolet absorbent (hereinafter referred to as UVA) to surface-protective films comprising a polyolefin/adhesive layer for vehicles, steel pipes and others, for the purpose of improving the weather resistance of the films.

In JP-A Hei-6-212033, disclosed are polyolefin resin compositions comprising a high-molecular weight HALS (molecular weight: not smaller than 2000) and UVA. They say that the coatability of the compositions in high-solid-type coating is good and the weather resistance of the films of the compositions is good.

However, surface-protective films or sheets of conventional polyolefin resins for construction materials, furniture and others are not always satisfactory with respect to their surface-protective effect, apparent quality, etc. Surface-protective films or sheets of flexible polypropylene resins having an adhesive layer or an ink layer formed thereon are problematic in that the discoloration resistance, the weather resistance and the adhesion retentiveness of the ink layer and the adhesive layer are not always satisfactory even though the additives noted above are added thereto. The present invention is to provide flexible polypropylene resin compositions of which the moldings such as films or sheets have good weather resistance, and to provide films or sheets of the compositions. The invention is also to provide flexible polypropylene resin compositions capable of being formed into surface-protective films or sheets as combined with an ink layer and/or an adhesive layer formed on their inner surface, in which the ink layer has good discoloration resistance and weather resistance and the adhesive layer has good adhesion retentiveness and weather resistance, and to provide surface-protective films or sheets of the compositions of which the inner surface is optionally supported by a substrate film or sheet.

SUMMARY OF THE INVENTION

In order to attain the objects noted above, we, the present inventors have assiduously studied and, as a result, have found that the flexible polypropylene resin compositions mentioned below and also their moldings especially films or sheets satisfy the requirements for the objects. On the basis of these findings, we have completed the invention.

DETAILED DESCRIPTION OF THE PREFERRED EMBODIMENTS

Specifically, the invention provides the following:

(1) A flexible polypropylene resin composition comprising 100 parts by weight of a flexible polypropylene resin having (a) a peak melting temperature (Tm) of 150° C. or above as measured through differential scanning calorimetry (DSC) and (b) a tensile modulus of elasticity of from 200 to 700 MPa, and from 0.05 to 5 parts by weight of a hindered amine light stabilizer.

(2) The flexible polypropylene resin composition of (1), wherein the flexible polypropylene resin comprises (A) from 20 to 100% by weight of a propylene homopolymer having (c) a pentad fraction, rrrr/(1-mmmm)×100, as measured through isotopic carbon nuclear magnetic resonance spectrometry ($^{13}$C-NMR) of from 20 to 60%, and (d) a melting enthalpy ($\Delta$H) as measured through differential scanning calorimetry (DSC) of from 10 to 100 J/g, and/or a propylene copolymer containing at most 4% by weight of other olefin units and having the physical data of (c) and (d), and (B) from 0 to 80% by weight of a propylene copolymer containing from 10 to 80% by weight of non-propylene olefin units.

(3) The flexible polypropylene resin composition of (1) or (2), which further contains from 0.05 to 5 parts by weight of a benzotriazole ultraviolet absorbent relative to 100 parts by weight of the flexible polypropylene resin.

(4) The flexible polypropylene resin composition of (3), wherein the benzotriazole ultraviolet absorbent is a compound having a molecular weight of not smaller than 400.

(5) A film or sheet shaped from the flexible polypropylene resin composition of any one of (1) to (4).

(6) A surface-protective film or sheet as produced by forming at least an adhesive layer on one surface of the film or sheet of (5).

(7) A surface-protective film or sheet as produced by forming at least an ink layer on one surface of the film or sheet of (5).

(8) A surface-protective film or sheet as produced by forming at least a substrate film or sheet on one surface of the film or sheet of (5).

BEST MODES OF CARRYING OUT THE INVENTION

The flexible polypropylene resin for use in the invention is not specifically defined, provided that it has (a) a peak melting temperature (Tm) of 150° C. or above as measured through differential scanning calorimetry (DSC) and (b) a tensile modulus of elasticity of from 200 to 700 MPa, and it may be a propylene homopolymer, or a propylene copolymer with any other olefins, or a mixture of these. As the resin component, employable is any of (A) a propylene homopolymer and/or a propylene copolymer containing at most 4% by weight of other olefin units, or a composition comprising the resin component (A) and (B) a propylene copolymer that contains from 10 to 80% by weight of non-propylene olefin units.

Especially preferably, however, the flexible polypropylene resin comprises (A) from 20 to 100% by weight of a propylene homopolymer having, in addition to the peak melting point (a) and the tensile modulus of elasticity (b) falling within the ranges noted above, (c) a pentad fraction, rrrr/(1-mmmm)×100, as measured through isotopic carbon nuclear magnetic resonance spectrometry ($^{13}$C-NMR) of from 20 to 60%, and (d) a melting enthalpy ($\Delta$H) as measured through differential scanning calorimetry (DSC) of from 10 to 100 J/g, and/or a propylene copolymer containing at most 4% by weight of other olefin units and having the physical data of (a) to (d), and (B) from 0 to 80% by weight of a propylene copolymer containing from 10 to 80% by weight of non-propylene olefin units.

The preferred properties (a) to (d) of the flexible polypropylene resin for use in the invention are described below.

First, the flexible polypropylene resin must have (a) a peak melting temperature (Tm) of 150° C. or above as measured through differential scanning calorimetry (DSC). If Tm of the resin is lower than 150° C., the resin composition could not have good heat resistance. Tm generally falls between 150 and 165° C. Tm is measured with Perkin-Elmer's DSC-7, in terms of the peak melting temperature according to JIS-K7121.

Next, the flexible polypropylene resin must have (b) a tensile modulus of elasticity of from 200 to 700 MPa, but preferably from 400 to 600 MPa. If the modulus is smaller than 200 MPa, the strength and the stiffness of the resin composition will be poor. If, however, larger than 700 MPa, the flexibility and the low-temperature impact resistance of the resin composition will be poor. The tensile modulus of elasticity of the resin is measured according to JIS-K7113. It is desirable that the component (A) comprising a propylene homopolymer and/or a propylene copolymer containing at most 4% by weight of other olefin units has (c) a pentad fraction, rrrr/(1-mmmm)×100, as measured through isotopic carbon nuclear magnetic resonance spectrometry ($^{13}$C-NMR) of from 20 to 60%. If the pentad fraction is smaller than 20% by weight, the resin composition will have poor heat resistance. If, however, larger than 60% by weight, the flexibility of the resin composition will be poor. For these reasons, the preferred range of the pentad fraction, rrrr/(1-mmmm)×100, falls between 25 and 55%. "rrrr" as referred to herein is meant to indicate the configuration of a polypropylene structure in which 5 side chains of methyl groups are positioned alternately in the opposite directions relative to the main chain of carbon-carbon bonds composed of any continuous 5 propylene units, or its proportion in the propylene polymer; and "mmmm" also referred to herein is meant to indicate the configuration of a polypropylene structure in which 5 side chains of methyl groups are positioned all in the same direction relative to the main chain of carbon-carbon bonds composed of any continuous 5 propylene units, or its proportion in the propylene polymer.

The value rrrr/(1-mmmm)×100 is measured as follows: Using JNM-FX-200 (manufactured by JOEL Ltd.; $^{13}$C-NMR frequency, 50.1 MHz), a polymer sample is subjected to $^{13}$C-NMR, for which the measuring mode is of proton complete decoupling, the pulse width is 6.9 μs (45°), the pulse repeating time is 3 seconds, the number of integrations is 10000, the solvent is 1,2,4-trichlorobenzene/heavy benzene (90/10%, by volume), the sample concentration is 250 mg/2.5 ml of solvent, and the system temperature is 130° C. Based on the difference in the chemical shift owing to the stereospecificity of the methyl groups in the polymer sample, or that is, on the areal intensity ratio of each peak of mmmm to mrrm appearing in the range of from 19.5 to 22.5 ppm, the pentad fraction of the polymer sample is measured, and the value of rrrr/(1-mmmm)×100 is obtained.

mmmm: 21.86 ppm
mmmr: 21.62 ppm
mmrr: 21.08 ppm
mmrm+rrmr: 20.89 ppm
rrrr: 20.36 ppm
mrrm: 19.97 ppm In addition, it is further preferable that the component (A) has (d) a melting enthalpy (ΔH) as measured through differential scanning calorimetry (DSC) of from 10 to 100 J/g. If ΔH is larger than 100 J/g, the resin composition will lose flexibility and therefore the object of the invention could not be attained. More preferably, ΔH falls between 20 and 100 J/g. ΔH is measured with Perkin-Elmer's DSC-7 in terms of the total heat energy as absorbed by the polymer being melted, according to JIS K-7122. In measuring Tm and ΔH through DSC, the heating and cooling rate is 10° C./min.

It is also desirable that the component (A) comprising a propylene homopolymer and/or a propylene copolymer containing at most 4% by weight of other olefin units has a boiling n-heptane-insoluble content of from 40 to 95% by weight. If the boiling n-heptane-insoluble content of the component (A) is larger than 95% by weight, the resin composition will lose flexibility. However, if smaller than 40% by weight, the mechanical strength of the resin composition will poor. In view of the balance of the flexibility and the mechanical strength of the resin composition, the more preferred range of the boiling n-heptane-insoluble content of the component (A) falls between 45 and 90% by weight. The boiling n-heptane-insoluble content of the component (A) is calculated from the extraction residue of the component (A) having been extracted with boiling n-heptane for 6 hours in a Soxhlet's extraction tester.

In the propylene homopolymer and/or copolymer containing at most 4% by weight of other olefin units, in general, carbons having side chains of methyl groups are not positioned adjacent to each other in the propylene chain moiety, or that is, there is no inverted carbon-to-carbon bonding therein. In these, the carbons having side chains of methyl groups are alternately positioned in regular order in the propylene chain moiety. In other words, in the polymers of the invention, the propylene units are bonded in a mode of head-tail bonding, and there is substantially neither head-head bonding nor tail-tail bonding.

In the propylene copolymer containing at most 4% by weight of other olefin units, the comonomer olefins for the other olefin units include, for example, α-olefins such as ethylene, butene-1, pentene-1, 4-methyl-1-pentene, hexene-1, heptene-1, octene-1, nonene-1, decene-1, etc. Of those, preferred is ethylene. One or more of these olefins may be used either singly or as combined. It is necessary that the comonomer olefins are so used that the olefin-derived unit content of the resulting propylene copolymer is at most 4% by weight.

The flexible polypropylene resin for use in the invention may comprise a resin of the component (A), and a propylene copolymer (B) that contains from 10 to 80% by weight of non-propylene olefin units. In this, the comonomer olefins for the non-propylene olefin units include, for example, α-olefins such as ethylene, butene-1, pentene-1, 4-methyl-1-pentene, hexene-1, heptene-1, octene-1, nonene-1, decene-1, etc.; dienes such as butadiene, dicyclopentadiene, tricyclopentadiene, etc. One or more of these comonomer olefins may be used either singly or as combined.

Where the flexible polypropylene resin component for use in the invention contains the propylene copolymer of the component (B), the amount of the component (B) that may be in the resin component is at most 80% by weight. The presence of the component (B) in an amount of larger than 80% by weight is unfavorable in view of the strength, the elasticity and the heat resistance of the resin composition. Preferably, the amount of the component (B) that may be in the resin component is not larger than 70% by weight, more preferably not larger than 60% by weight.

In the flexible polypropylene resin for use in the invention, it is desirable that the polypropylene resin of the component (A) has a melt index (MI) falling between 0.5 and 200 g/10 min. If MI of the component (A) is smaller than 0.5 g/10 min, the resin composition will be difficult to mold; but if larger than 200 g/10 min, the mechanical properties of the moldings of the composition will be poor. In view of the balance between the moldability and the mechanical properties of the moldings, the more preferred range of MI falls between 2 and 100 g/10 min. MI is measured under a load of 2.16 kgf and at a temperature of 230° C.

It is desirable that the polypropylene resin of the component (B) which may be in the flexible polypropylene resin in the invention has a limiting viscosity [η] falling between 0.1 and 10. If [η] is smaller than 0.1, the mechanical properties of the moldings of the resin composition will be poor. If, however, [η] is larger than 10, the resin composition will be difficult to mold. In view of the balance between the mechanical properties of the moldings and the moldability, the more preferred range of [η] falls between 0.5 and 7.0. [η] is measured in decalin at 135° C.

The flexible polypropylene resin comprising the component (A) or the components (A) and (B) for use in the invention may be prepared, for example, through single-stage vapor-phase polymerization, single-stage slurry polymerization, multi-stage vapor-phase polymerization, multi-stage slurry polymerization, blending or the like. For example, where the resin is prepared through polymerization, propylene may be homopolymerized or copolymerized with any other olefins in the presence of a catalyst system comprising (W) a solid component that comprises (i) a solid catalyst component composed of magnesium, titanium, a halogen atom and an electron donor, optionally combined with (ii) a crystalline polyolefin, (X) an organic aluminium compound, (Y) an alkoxy group-having aromatic compound, and optionally combined with (Z) an electron-donating compound.

The solid component (W) comprises (i) a solid catalyst component composed of magnesium, titanium, a halogen atom and an electron donor, optionally combined with (ii) a crystalline polyolefin. The solid catalyst component (i) comprises, as the indispensable ingredients, magnesium, titanium, a halogen atom and an electron donor. This may be prepared by contacting a magnesium compound and a titanium compound with an electron donor. In this case, the halogen atom may be in the magnesium compound and/or the titanium compound in the form of a halide.

The magnesium compound includes, for example, magnesium dihalides such as magnesium chloride, etc.; magnesium oxide, magnesium hydroxide, hydrotalcite, magnesium carboxylates; alkoxymagnesiums such as diethoxymagnesium, etc.; aryloxymagnesiums, alkoxymagnesium halides, aryloxymagnesium halides; alkylmagnesiums such as ethylbutylmagnesium, etc., alkylmagnesium halides; as well as reaction products of organic magnesium compounds with electron donors, halosilanes, alkoxysilanes, silanols, aluminium compounds, etc. Of those, preferred are magnesium halides, alkoxymagnesiums, alkylmagnesiums, alkylmagnesium halides. One or more of these magnesium compounds may be used either singly or as combined.

As the magnesium compound, also usable are reaction products of metal magnesium, halogens and alcohols. The metal magnesium is not specifically defined, and may have any grain size. For example, employable is any of granular, ribbon-like or powdery metal magnesium. The surface condition of the metal magnesium is not also specifically defined. Preferably, however, the metal magnesium does not have a film of magnesium oxide or the like on its surface.

The alcohol is not also specifically defined, but preferably used is a lower alcohol having from 1 to 6 carbon atoms. Especially preferred is ethanol, as producing a solid catalyst component capable of greatly improving the expression of the catalyst capabilities. The purity and the water content of the alcohol are not also specifically defined. However, if an alcohol having a large water content is used, magnesium hydroxide may be formed on the surface of the metal magnesium.

Therefore, preferred is an alcohol having a water content of not larger than 1% by weight, especially not larger than 2000 ppm. Alcohols having a smaller water content are better.

The halogens and/or the halogen-containing compounds for use in the invention are not specifically defined. Any and every compound containing a halogen atom in the molecule can be used herein. In the halogen-containing compounds, the type of the halogen atom is not specifically defined. Preferred is chlorine, bromine or iodine; and especially preferred is iodine. Of the halogen-containing compounds, especially preferred are halogen-containing metal compounds. Their condition, shape and grain size are not specifically defined and may be any desired ones. For example, the compounds may be used in the form of a solution in an alcoholic solvent (e.g., ethanol).

The amount of the alcohol to be used may falls between 2 and 100 mols, preferably between 5 and 50 mols, relative to one mol of the metal magnesium. If the alcohol is too much, magnesium compounds with good morphology are difficult to obtain. If too small, on the other hand, the reaction between the alcohol and the metal magnesium could not be effected smoothly.

The halogen and/or the halogen-containing compound may be used generally in an amount of not smaller than 0.0001 gram atoms, but preferably not smaller than 0.0005 gram atoms, more preferably not smaller than 0.001 gram atoms, in terms of the halogen atom relative to one gram atom of the metal magnesium. If it is smaller than 0.0001 gram atoms, and if the resulting magnesium compounds are directly used without being ground, the amount of the compound to be carried on the catalyst will be low and, in addition, the activity of the catalyst and even the stereospecificity and the morphology of the polymer formed will be poor. For these reasons, unfavorably, the magnesium compounds formed indispensably require grinding. By suitably varying the amount of the halogen and/or the halogen-containing compound to be used, the grain size of the magnesium compound to be formed can be controlled in any desired manner.

The reaction of the metal magnesium, the alcohol and the halogen and/or the halogen-containing compound may be effected in any per-se known manner. For example, a metal magnesium, an alcohol and a halogen and/or halogen-containing compound may be reacted under reflux until no hydrogen gas is formed, generally for about 20 to 30 hours to obtain the intended magnesium compound. Concretely, where iodine is used as the halogen, a metal magnesium and a solid iodine are put into an alcohol, and then heated under reflux; or an alcoholic solution of a metal magnesium and iodine is dropwise added to an alcohol, and then heated under reflux; or an alcoholic solution of a metal magnesium is heated, to which is dropwise added an alcoholic solution of iodine. In any of these methods, it is desirable that the reaction is effected in an inert gas atmosphere of nitrogen gas, argon gas or the like, optionally in an inert organic solvent (e.g., saturated hydrocarbons such as n-hexane, etc.). Regarding the mode of putting the metal magnesium, the alcohol and the halogen and/or halogen-containing compound into a reactor, it is not always necessary that they are entirely put in the reactor prior to the start of the reaction, but they may be divided into plural portions and may be separately put into the reactor. In one preferred embodiment, the entire amount of an alcohol is first put into a reactor, and thereafter a metal magnesium having been divided into plural portions is added thereto intermittently.

In that embodiment, formation of a large amount of hydrogen gas at a time may be prevented. Therefore, the embodiment is especially preferred. In addition, the size of the reactor for the embodiment may be small. Moreover, in the embodiment, the alcohol and the halogen and/or halogen-containing compound may be prevented from being bubbled due to the large amount of hydrogen gas formed at a time. The number of the plural portions of the metal magnesium to be separately added to the reactor may be determined, depending on the scale of the reactor used. In view of the easiness in handling the reaction system, in general, the number may be preferably from 5 to 10. Needless-to-say, the reaction per se may be effected either batchwise or continuously. In another modification, the entire amount of an alcohol is first put into a reactor, and a metal magnesium is added thereto little by little. Then, the product formed through the reaction is separated into a different tank to remove it, and thereafter the remaining metal magnesium is again added to the reactor also little by little. The removal of the product and the addition of the metal magnesium may be repeated.

The magnesium compound thus prepared is used in preparing the solid catalyst component. For this, the magnesium compound maybe dried, or, after having been taken out through filtration, it may be washed with an inert solvent such as heptane or the like. In any case, the magnesium compound does not require grinding or classification for dressing, and may be used directly in the next step.

The titanium compound for use in the invention includes, for example, tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium halides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, dipropoxytitanium dichloride, di-n-butoxytitanium dichloride, diethoxytitanium dibromide, etc.; trialkoxytitanium monohalides such as trimethoxytitanium chloride, triethoxytitanium chloride, tripropoxytitanium chloride, tri-n-butoxytitanium chloride, etc. Of those, preferred are high-halogen-containing titanium compounds, and especially preferred is titanium tetrachloride. One or more of these titanium compounds may be used either singly or as combined.

The electron donor may be the same as the electron-donating compound for the component (Z), of which the examples will be mentioned hereinunder.

To prepare the solid catalyst component (i), employable are any known methods (JP-A Sho-53-43094, Sho-55-135102, Sho-55-135103, Sho-56-18606, Sho-56-166205, Sho-57-63309, Sho-57-190004, Sho-57-300407, Sho-58-47003).

The composition of the solid catalyst component (i) thus prepared is generally such that the atomic ratio of magnesium/titanium therein falls between 2 and 100, the atomic ratio of halogen/titanium falls between 5 and 100 and the molar ratio of electron donor/titanium falls between 0.1 and 10.

The crystalline polyolefin (ii) that is optionally used in preparing the solid component (W) may be obtained from α-olefins having from 2 to 10 carbon atoms, including, for example, polyethylene, polypropylene, polybutene, poly-4-methyl-1-pentene, etc. The crystalline polyolefin may be prepared in any of (1) a method of prepolymerizing an olefin in the presence of a combination of the solid catalyst component (i) noted above, an organic aluminium compound and optionally an electron-donating compound (prepolymerization method); (2) a method of dispersing the solid catalyst component (i) noted above and optionally an organic aluminium compound and an electron-donating compound (having a melting point of not lower than 100° C.) into a powdery, crystalline polyethylene or polypropylene or the like having a uniform grain size (dispersion method); or (3) a combination of the methods (1) and (2).

In the prepolymerization method (1), the atomic ratio of aluminium/titanium generally falls between 0.1 and 100, preferably between 0.5 and 5, and the molar ratio of electron-donating compound/titanium falls between 0 and 50, preferably between 0.1 and 2.

In the solid component (W), the amounts of the solid catalyst component (i) and the crystalline polyolefin (ii) are so controlled that the ratio by weight of (ii) to (i) generally falls between 0.33 and 200, preferably between 1 and 50.

As the organic aluminium compound for the component (X), for example, preferably employed is any of trialkylaluminiums such as trimethylaluminium, triethylaluminium, triisopropylaluminium, triisobutylaluminium, trioctylaluminium, etc.; dialkylaluminium monohalides such as diethylaluminium monochloride, diisopropylaluminium monochloride, diisobutylaluminium monochloride, dioctylaluminium monochloride, etc.; alkylaluminium sesquihalides such as ethylaluminium sesquichloride, etc. One or more of these aluminium compounds may be used herein either singly or as combined.

The catalyst system to be used for producing the flexible polypropylene resin for use in the invention comprises an alkoxy group-having aromatic compound as the component (Y). As specific examples of the alkoxy group-having aromatic compound, mentioned are monoalkoxy compounds such as m-methoxytoluene, o-methoxyphenol, m-methoxyphenol, 2-methoxy-4-methylphenol, vinylanisole, p-(1-propenyl)anisole, p-allylanisole, 1,3-bis(p-methoxyphenyl)-1-pentene, 5-allyl-2-methoxyphenol, 4-hydroxy-3-methoxybenzyl alcohol, methoxybenzyl alcohol, nitroanisole, nitrophenetole, etc.; dialkoxy compounds such as o-dimethoxybenzene, m-dimethoxybenzene, p-dimethoxybenzene, 3,4-dimethoxytoluene, 2,6-dimethoxyphenol, 1-allyl-3,4-dimethoxybenzene, etc.; trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl)benzene, 1,2,3-trimethoxybenzene, 1,2,4-trimethoxybenzene, etc. Of those, preferred are dialkoxy compounds and trialkoxy compounds. One or more of these alkoxy group-having aromatic compounds may be used either singly or as combined.

The catalyst optionally contains an electron-donating compound as the component (Z). The electron-donating compound has any of oxygen, nitrogen, phosphorus, sulfur, silicon, etc. Basically, any one capable of improving the specificity of the catalyst in polymerization of propylene may be used as the electron-donating compound for the component (Z).

The electron-donating compound of that type includes, for example, organic silicon compounds, esters, thioesters, amines, ketones, nitriles, phosphines, ethers, thioethers, acid anhydrides, acidhalides, acidamides, aldehydes, organicacids, azo compounds, etc.

For example, employable are organic silicon compounds such as diphenyldimethoxysilane, diphenyldiethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane, benzyltrimethoxysilane, cyclohexylmethyldimethoxysilane, etc.; monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate; aromatic dicarboxylates such as dimethyl phthalate, diethyl phthalate, dipropyl phthalate, dibutyl phthalate, diisobutyl phthalate, diamyl phthalate, diisoamyl phthalate, methylethyl phthalate, methylisobutyl phthalate, methylpropyl phthalate, ethylbutyl phthalate, ethylisobutyl phthalate, ethylpropyl phthalate, propylisobutyl phthalate, dimethyl terephthalate, diethyl terephthalate, dipropyl terephthalate, diisobutyl terephthalate, methylethyl terephthalate, methylisobutyl terephthalate, methylpropyl terephthalate, ethylbutyl terephthalate, ethylisobutyl terephthalate, ethylpropyl terephthalate, propylisobutyl terephthalate, dimethyl isophthalate, diethyl isophthalate, dipropyl isophthalate, diisobutyl isophthalate, methylethyl isophthalate, methylisobutyl isophthalate, methylpropyl isophthalate, ethylbutyl isophthalate, ethylisobutyl isophthalate, ethylpropyl isophthalate, propylisobutyl isophthalate, etc.; monoesters such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, etc.; esters such as γ-butyrolactone, δ-valerolactone, coumarin, phthalide, ethylene carbonate, etc.; organic acids such as benzoic acid, p-hydroxybenzoic acid, etc.; acid anhydrides such as succinic anhydride, benzoic anhydride, p-toluic anhydride, etc.; ketones such as acetone, methyl ethyl ketone, methyl isobutyl ketone, acetophenone, benzophenone, benzoquinone, etc.; aldehydes such as acetaldehyde, propionaldehyde, octylaldehyde, tolualdehyde, benzaldehyde, naphthylaldehyde, etc.; acid halides such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, dicyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride, benzene-1,2,4-tricarbonyl trichloride, etc.; ethers such as methyl ether, ethyl ether, isopropyl ether, n-butyl ether, isopropyl methyl ether, isopropyl ethyl ether, t-butyl ethyl ether, t-butyl-n-propyl ether, t-butyl n-butyl ether, t-amyl methyl ether, t-amyl ethyl ether, amyl ether, tetrahydrofuran, anisole, diphenyl ether, ethylene glycol butyl ether, etc.; acid amides such as acetic acid amide, benzoic acid amide, toluic acid amide, etc.; amines such as tributylamine, N,N'-dimethylpiperazine, tribenzylamine, aniline, pyridine, pyrroline, tetramethylethylenediamine, etc.; nitriles such as acetonitrile, benzonitrile, tolunitrile, etc.; azo compounds having a steric hindrance substituent as bonded to the azo bond, such as 2,2'-azobis(2-methylpropane), 2,2'-azobis(2-ethylpropane), 2,2'-azobis(2-methylpentane), etc.

Of those, preferred are organic silicon compounds, esters, ketones, ethers, thioethers, acidanhydrides, and acidhalides. Especially preferred are organic silicon compounds such as diphenyldimethoxysilane, phenyltriethoxysilane, cyclohexylmethyldimethoxysilane, etc.; aromatic dicarboxylates such as di-n-butyl phthalate, diisobutyl phthalate, etc.; alkyl esters of aromatic monocarboxylic acids such as benzoic acid, p-methoxybenzoic acid, p-ethoxybenzoic acid, toluic acid, etc. One or more of these electron-donating compounds may be used either singly or as combined.

Regarding the amounts of the components for the catalyst system, the solid component (W) may be used in an amount of generally from 0.0005 to 1 mol, in terms of the titanium atom, relative to one liter of the reaction volume. The organic aluminium compound (X) may be in an amount of generally from 1 to 3000, but preferably from 40 to 800, in terms of the ratio of aluminium/titanium. If the amounts overstep the defined ranges, the catalytic activity of the catalyst will be low. The alkoxy group-having aromatic compound (Y) may be in an amount of generally from 0.01 to 500, but preferably from 1 to 300, in terms of the molar ratio relative to the titanium atom in the solid component (W). If the amount is smaller than 0.01, the physical properties of the polymer to be produced will be bad. If, however, larger than 500, the catalytic activity of the catalyst will be poor.

To prepare the component (A) for the flexible polypropylene resin that comprises a propylene homopolymer and/or a propylene copolymer containing at most 4% by weight of other olefin units, for example, propylene may be homopolymerized or copolymerized with a small amount of other olefins in one-stage polymerization using the catalyst system noted above to produce a resin of the component (A). To prepare a mixture of the component (A) and the component (B) of a propylene copolymer, for the flexible polypropylene resin, for example, a resin of the component (A) is first produced in the first polymerization step (one-stage polymerization) in the same manner as previously, and thereafter propylene is copolymerized with other olefins in the next polymerization step to form the propylene copolymer for the component (B).

The polymerization mode for preparing the components (A) and (B) is not specifically defined, including, for example, slurry polymerization, vapor-phase polymerization, bulk polymerization, solution polymerization, suspension polymerization, etc.

Where a resin of the component (A) is prepared in vapor-phase polymerization, for example, the polymerization pressure generally falls between 10 and 45 kg/cm$^2$, preferably between 20 and 30 kg/cm$^2$, and the polymerization temperature generally falls between 40 and 90° C., preferably between 60 and 75° C. Where a propylene copolymer of the component (B) is prepared also in vapor-phase polymerization, for example, the polymerization pressure generally falls between 5 and 30 kg/cm$^2$, preferably between 10 and 20 kg/cm$^2$, and the polymerization temperature generally falls between 20 and 90° C., preferably between 40 and 60° C. In any stage of polymerization, the molecular weight of the polymer to be formed may be controlled by any ordinary means, for example, by controlling the hydrogen concentration in the polymerization reactor. If desired, (co)polymers having a relatively high molecular weight may be formed in the polymerization step, and the resulting (co)polymers may be mixed in melt with an organic peroxide so as to control their molecular weight to fall within a desired range. The polymerization time may fall between 5 minutes and 10 hours or so.

In producing polymers in the presence of the catalyst system, the components (W) to (Z) to constitute the catalyst system are mixed in a predetermined ratio and contacted with each other, and thereafter the starting monomers may be immediately introduced into the catalyst system. Alternatively, after the thus-prepared catalyst system is ripened for 0.2 to 3 hours, the starting monomers may be introduced into thereinto. If desired, the catalyst components may be applied to the polymerization system, after having been suspended in the inert solvent to be used or in the starting monomers of olefins to be polymerized.

After the polymerization, the polymers produced may be post-treated in any ordinary manner. For example, in vapor-phase polymerization, the powdery polymer produced is taken out of the polymerization reactor, into which nitrogen or the like may be introduced in streams so as to remove the non-reacted monomers and others from the polymer. If desired, the powdery polymer may be pelletized through an extruder. In this case, a small amount of water, an alcohol or the like may be added to the polymer so as to completely inactivate the remaining catalyst. In bulk polymerization, the polymer produced is taken out of the polymerization reactor, then the non-reacted monomers are removed from the polymer, and thereafter the polymer may be pelletized.

Where a flexible polypropylene resin comprising the components (A) and (B) is used in the invention, a resin for the component (A) and that for the component (B) may be separately prepared, and these may be mixed in a predetermined ratio in any known manner (for example, through dry blending, solution blending, or kneading) to prepare a mixture of the components (A) and (B).

As the hindered amine light stabilizer for use in the invention, mentioned are low-molecular weight compounds having a molecular weight of smaller than 1000. The compounds include, for example, bis(2,2,6,6-tetramethyl-4-piperidyl) sebacate, tetrakis(2,2,6,6-tetramethyl-4-piperidyl) 1,2,3,4-butanetetracarboxylate, 2,2,6,6-tetramethyl-4-piperidyl benzoate, bis-(1,2,2,6,6-pentamethyl-4-piperidyl) 2-(3,5-di-t-butyl-4-hydroxybenzyl)-2-n-butylmalonate, bis-(N-methyl-2,2,6,6-tetramethyl-4-piperidyl) sebacate, 1,1'-(1,2-ethanediyl)-bis(3,3,5,5-tetramethylpiperadinone), (mixed 2,2,6,6-tetramethyl-4-piperidyl/tridecyl)-1,2,3,4-butane-tetracarboxylate, (mixed 1,2,2,6,6-pentamethyl-4-piperidyl/tridecyl)-1,2,3,4-butane-tetracarboxylate, tetrakis (1,2,2,6,6-pentamethyl-4-piperidyl) 1,2,3,4-butanetetracarboxylate, 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidyl, 8-benzyl-7,7,9,9-tetramethyl-3-octyl-1,3,8-triazaspiro[4,5] undecane-2,4-dione, 8-acetyl-3-dodecyl-7,7,9,9-tetramethyl-1,3,8-triazaspiro[4,5]decane-2,4-dione, bis(1-octyloxy-2,2,6,6-tetramethyl-4-piperidyl) sebacate, etc.

Also mentioned are high-molecular weight compounds having a molecular weight of 1000 or more, which include, for example, dimethyl succinate/1-(2-hydroxyethyl)-4-hydroxy-2,2,6,6-tetramethylpiperidyl polycondensates, poly [{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], N,N'-bis(3-aminopropyl)ethylenediamine/2,4-bis [N-butyl-N-(1,2,2,6,6-pentamethyl-4-piperidyl)amino]-6-chloro-1,3,5-triazine condensates, mixed {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate, mixed {2,2,6,6-tetramethyl-4-piperidyl/β,β,β',β'-tetramethyl-3,9-[2,4,8,10-tetroaxaspiro (5,5)undecane]diethyl}-1,2,3,4-butane-tetracarboxylate, poly[{6-morpholino-1,3,5-triazine-2,4-diyl}{(2,2,6,6-tetramethyl-4-piperidyl)imino}hexamethylene{(2,2,6,6-tetramethyl-4-piperidyl)imine}], etc.

Of those, preferred are bis-(1,2,2,6,6-pentamethyl-4-piperidyl)-2-(3,5-di-t-butyl-4-hydroxybenzyl)-2-n-butyl-malonate, N,N'-bis(3-aminopropyl)ethylenediamine/2,4-bis [N-butyl-N-(1,2,2,6,6-pentamethyl-4-piperidyl)amino]-6-chloro- 1,3,5-triazine condensates, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imine}], bis(1-octyloxy-2,2,6,6-tetramethyl-4-piperidyl) sebacate, tetrakis(1,2,2,6,6-pentamethyl-4-piperidyl) 1,2,3,4-butane-tetracarboxylate, etc.

One or more of these hindered amine light stabilizers may be used either singly or as combined. Preferred is a combination of a low-molecular weight compound (having a molecular weight of lower than 1000) and a high-molecular weight compound (having a molecular weight of 1000 or higher).

The benzotriazole ultraviolet absorbent for use in the invention includes, for example, 2,2'-methylene-bis[4-(1,1,3,3-tetramethylbutyl)-6-[(2H-benzotriazol-2-yl)phenol]], 2-(5-methyl-2-hydroxyphenyl)benzotriazole, 2-(3,5-di-t-butyl-2-hydroxyphenyl)-5-chlorobenzotriazole, 2-(3-t-butyl-5-methyl-2-hydroxyphenyl)-5-chlorobenzotriazole, 2-(3,5-di-t-amyl-2-hydroxyphenyl)benzotriazole, 2-(3,5-di-t-butyl-2-hydroxyphenyl)benzotriazole, 2-(5-t-butyl-2-hydroxyphenyl)benzotriazole, 2-(5-t-octyl-2-hydroxyphenyl)benzotriazole, 2-[2-hydroxy-3-(3,4,5,6-tetrahydrophthalimidomethyl)-5-methylphenyl] benzotriazole, 2-(2-hydroxy-4-octyloxyphenyl) benzotriazole, 2-[2-hydroxy-3,5-bis(α,α'-dimethylbenzyl) phenyl]-2H-benzotriazole, reaction products of methyl-3-[3-(2H-benzotriazol-2-yl)-5-t-butyl-4-hydroxyphenyl] propionate/polyethylene glycol 300, 2-(2H-benzotriazol-2-yl)-6-dodecyl-4-methylphenol, 2-(3,5-di-t-pentyl-2-hydroxyphenyl)-2H-benzotriazole, 2-(2H-benzotriazol-2-yl)-4-methyl-6-(3,4,5,6-tetrahydrophthalimidylmethyl) phenol, etc.

Of those, preferred are 2,2'-methylene-bis[4-(1,1,3,3-tetramethylbutyl)-6-[(2H-benzotriazol-2-yl)phenol]], 2-(3-t-butyl-5-methyl-2-hydroxyphenyl)-5-chlorobenzotriazole, 2-(3,5-di-t-butyl-2-hydroxyphenyl)benzotriazole, etc. Especially preferred are high-molecular weight compounds having a molecular weight of 400 or higher, such as 2,2'- methylene-bis[4-(1,1,3,3-tetramethylbutyl)-6-[(2H-benzotriazol-2-yl)phenol]], etc. Also preferred are compounds having at least 2 benzotriazolyl groups.

One or more of these benzotriazole ultraviolet absorbents may be used either singly or as combined.

The amount of the hindered amine light stabilizer to be in the resin composition of the invention falls between 0.05 and 5 parts by weight, but preferably between 0.1 and 3 parts by weight, relative to 100 parts by weight of the flexible polypropylene resin in the composition. If the amount is smaller than 0.05 parts by weight, the composition could not have good weather resistance. If, however, larger than 5 parts by weight, the composition will unfavorably bleed out.

In one preferred embodiment of the invention, the resin composition contains a benzotriazole ultraviolet absorbent. In this, the amount of the ultraviolet absorbent to be in the composition may fall between 0.05 and 5 parts by weight, but preferably between 0.1 and 3 parts by weight, relative to 100 parts by weight of the flexible polypropylene resin in the composition. If the amount is smaller than 0.05 parts by weight, the resin composition could not have good weather resistance. If, however, larger than 5 parts by weight, the composition will unfavorably bleed out. Non-benzotriazole ultraviolet absorbents such as benzophenones, benzoates or the like could not produce the intended results.

In order to improve the discoloration resistance, weather resistance and adhesion retentiveness of the ink layer and the adhesive layer which will be mentioned hereinunder, the hindered amine light stabilizer or the benzotriazole ultraviolet absorbent may be directly added to the ink or adhesive that forms the layers.

To add the hindered amine light stabilizer, the benzotriazole ultraviolet absorbent and other optional additives to the flexible polypropylene resin in the invention, any known methods are employed. For example, they may be mixed in a tumbler blender, a Henschel mixer or the like, or, after having been mixed, the resulting mixture may be melt-kneaded and granulated through a single-screw or double-screw extruder, or through a kneader, a Bumbury mixer or the like to obtain the intended flexible polypropylene resin composition. If desired, a high-concentration hindered amine light stabilizer and/or benzotriazole ultraviolet absorbent may be kneaded in a flexible polypropylene resin to prepare a master batch, and the resulting master batch may be mixed with an additional flexible polypropylene resin to produce the intended flexible polypropylene resin composition.

When prepared in the form of a powdery polymer through polymerization, the flexible polypropylene resin may be degraded with a peroxide in an extruder, thereby having a lower molecular weight. The resin composition containing the thus-degraded resin is easy to handle while it is molded. The degraded resin may have an increased degree of fluidity, but its pentad fraction, peak melting temperature and melting enthalpy change little. The peroxide to be used for that purpose includes, for example, 2,5-dimethyl-2,5-di-(t-butylperoxy)-hexane, 1, 3-bis (t-butylperoxyisopropyl) benzene, 2,5-dimethyl-2,5-di-(t-butylperoxy)hexyne-3, etc. When the resin is mixed with the peroxide, an antioxidant, a stabilizer and a chlorine-trapping agent may be optionally but preferably added thereto.

The flexible polypropylene resin composition of the invention may optionally contain any other resins and various additives. The additional additives include, for example, thermoplastic elastomers, thermoplastic resins, modified polyolefins, various stabilizers, organic or inorganic fillers, as well as antistatic agents, chlorine-trapping agents, anti-blocking agents, anti-foggants, organic flame retardants, flame retardation promoters, dyes, pigments, natural oils, synthetic oils, waxes, etc.

The thermoplastic elastomers include, for example, copolymer elastomers of ethylene and α-olefins having at least 3 carbon atoms; copolymer elastomers of ethylene, α-olefins having at least 3 carbon atoms and dienes, and their hydrogenates; styrene-diene copolymer elastomers and their hydrogenates; acrylonitrile copolymer elastomers, etc. The thermoplastic resins include, for example, low-density polyethylenes, high-density polyethylenes, linear low-density polyethylene copolymers, etc.

As the stabilizers, usable are any known ones, such as phenol stabilizers, organic phosphite stabilizers, thioether stabilizers, etc. The phenol stabilizers include, for example, 2, 6-di-t-butyl-4-methylphenol, 2, 6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-octylphenol, 2-isopropyl-4-methyl-6-t-butylphenol, 2-t-butyl-4-ethyl-6-t-octylphenol, 2-isobutyl-4-ethyl-5-t-hexylphenol, styrenated mixed cresol, dl-α-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(4,6-di-t-butylphenol), 2,2'-butylidenebis(2-t-butyl-4-methylphenol), 1,1,3-tris(2-methyl-4-hydroxy-5-t-butylphenyl)butane, triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,2'-thiodiethylene-bis [3-(3,5-di-t-butyl-4-hydroxyphenyl)propionate], N,N'-hexamethylenebis(3,5-di-t-butyl-4-hydroxy-hydrocinnamide), diethyl 3, 5-di-t-butyl-4-hydroxybenzylphosphonate, 1,3,5-tris(2,6-dimethyl-3-hydroxy-4-t-butylbenzyl) isocyanurate, 1,3,5-tris[(3,5-di-t-butyl-4-hydroxyphenyl)propionyloxyethyl] isocyanurate, tris(4-t-butyl-2,6-dimethyl-3-hydroxybenzyl) isocyanurate, 2,4-bis(n-octylthio)-6-(4-hydroxy-3,5-di-t-butylanilino)-1, 3,5-triazine, tetrakis[methylene-3-(3,5-di-t-butyl-4-hydroxyphenyl)propionate]methane, bis(ethyl 3,5-di-t-butyl-4-hydroxybenzylphosphonate)calcium, bis(ethyl 3,5-di-t-butyl-4-hydroxybenzylphosphonate)nickel, glycol bis [3,3-bis(3-t-butyl-4-hydroxyphenyl)butyrate], N,N'-bis[3-(3,5-di-t-butyl-4-hydroxyphenyl)propionyl]hydrazine, 2,2'-oxamidobis[ethyl-3-(3,5-di-t-butyl- 4-hydroxyphenyl) propionate], bis[2-t-butyl-4-methyl-6-(3-t-butyl-5-methyl-2-hydroxybenzyl)phenyl] terephthalate, 1,3,5-trimethyl-2,4, 6-tris(3,5-di-t-butyl-4-hydroxybenzyl)benzene, 3,9-bis[1,1-dimethyl-2-[□-(3-t-butyl-4-hydroxy-5-methylphenyl) propionyloxy]ethyl]-2,4,8,10-tetraoxaspiro[5,5]undecane, 2,2-bis[4-[2-(3,5-di-t-butyl-4-hydroxyhydrocinnamoyloxy)] ethoxyphenyl]propane, alkyl β-(3,5-di-t-butylphenol) propionates such as stearyl β-(4-hydroxy-3,5-di-t-butylphenol)propionate, etc.

The organic phosphite stabilizers include, for example, trioctyl phosphite, trilauryl phosphite, tristridecyl phosphite, trisisodecyl phosphite, phenyldiisooctyl phosphite, phenyldiisodecyl phosphite, phenyldi(tridecyl) phosphite, diphenylisooctyl phosphite, diphenyltridecyl phosphite, triphenyl phosphite, tris(nonylphenyl) phosphite, tris(2,4-di-t-butylphenyl) phosphite, tris(butoxyphenyl) phosphite, tetratridecyl-4,4'-butylidenebis(3-methyl-6-t-butylphenol)-diphosphite, 4,4'-isopropylidene-diphenolalkyl phosphites (in which the alkyl has from 12 to 15 carbon atoms or so), 4,4'-isopropylidenebis(2-t-butylphenol)-di(nonylphenyl) phosphite, tris(biphenyl) phosphite, tetra(tridecyl)-1,1,3-tris (2-methyl-5-t-butyl-4-hydroxyphenyl)butane diphosphite, tris(3,5-di-t-butyl-4-hydroxyphenyl) phosphite, hydrogenated 4,4'-isopropylidenediphenol polyphosphites, bis (octylphenyl)-bis[4,4'-butylidenebis(3-methyl- 6-t-butylphenol)]-1,6-hexanediol diphosphite, hexatridecyl-1,1, 3-tris(2-methyl-4-hydroxy-5-t-butylphenol) diphosphite, tris[4,4'-isopropylidenebis(2-t-butylphenol)] phosphite, tris (1,3-distearoyloxyisopropyl) phosphite, 9,10-dihydro-9-phosphophenanthrene-10-oxide, tetrakis(2,4-di-t-butylphenyl)-4,4'-biphenylene diphosphite, distearylpentaerythritol diphosphite, di(nonylphenyl) pentaerythritol diphosphite, phenyl-4,4'-isopropylidenediphenol-pentaerythritol diphosphite, bis(2, 4-di-t-butylphenyl)pentaerythritol diphosphite, bis(2,6-di-t-butyl-4-methylphenyl)pentaerythritol diphosphite, phenylbisphenol-A-pentaerythritol diphosphite, etc.

The organic thioether stabilizers include, for example, dilaurylthio dipropionate, distearylthio dipropionate, pentaerythritoltetralaurylthio propionate, etc.

The inorganic fillers include, for example, spherical fillers, tabular fillers, fibrous fillers, inorganic flame retardants, etc. The spherical fillers include, for example, calcium carbonate, kaolin (aluminium silicate), silica, sericite, diatomaceous earth, calcium sulfite, calcined alumina, calcium silicate, crystalline zeolite, amorphous zeolite, etc. The tabular fillers includes, for example, talc, mica, etc. The fibrous fillers include, for example, needle-like ones such as wollastonite, etc.; fibrous ones such as magnesium oxysulfate, potassium titanate fibers, fibrous calcium carbonate, etc.; completely fibrous ones such as glass fibers, etc. The inorganic flame retardants include, for example, aluminium hydrate, gypsum hydrate, zinc borate, barium borate, borax, kaolin, clay, calcium carbonate, alunite, basic magnesium carbonate, calcium hydroxide, magnesium hydroxide, etc.

The organic fillers include, for example, wood particles such as wood powder, cotton powder, etc.; as well as rice hull powder, crosslinked rubber power, plastic powder, collagen powder, etc.

Films or sheets of the composition of the invention noted above can be produced in any known molding method of, for example, inflation molding, cast molding, calender molding or the like. In multi-layered films or sheets, at least one layer shall be made from the resin composition of the invention in order that the films or sheets may produce the results of the invention which will be mentioned hereinunder. The thickness of the films or the sheets is not specifically defined, and may be suitably varied depending on their use.

The films or sheets of the invention made from the resin composition noted above are usable for surface protection.

Three typical examples of such surface-protective films or sheets are mentioned below.

One is a surface-protective film or sheet having at least an adhesive layer formed on its surface.

Another is a surface-protective film or sheet generally having at lease an ink layer formed on its surface, in which, in most cases, the ink layer is formed on the surface via an adhesive layer therebetween. In most cases, the surface-protective film or sheet of that type is applied onto the surface of a subject to be protected therewith, directly or via an adhesive layer formed over the ink layer. Typical applications of the film or sheet are for protective films, decorative films or sheets, display films, etc.

Still another is a surface-protective film or sheet comprising a film or sheet of the resin composition of the invention, in which, in general, at least an ink layer is formed on the surface of the resin film or sheet, and the resin film or sheet is supported by a substrate film or sheet optionally but in most cases having an ink layer on its surface via an adhesive layer therebetween. To produce the surface-protective film or sheet of that type, a film of sheet of the resin composition of the invention is attached to a substrate film or sheet via an adhesive layer therebetween; or alternatively, the resin composition is laminated on a substrate film or sheet through ordinary extrusion lamination.

In most cases, the surface-protective film or sheet has an adhesive layer on the substrate film or sheet, and is applied onto the surface of a subject to be protected therewith, or onto tabular materials, steel materials, supporting materials, etc. The substrate film or sheet may be any one made from the resin composition of the invention, or even from thermoplastic resins, modified polyolefins, thermoplastic elastomers, etc. Typical applications of the surface-protective film or sheet of that type are for construction sheets or films, decorative sheets or films, display sheets or films, etc.

These have the advantages of flexible polypropylene resins which have good apparent quality and are neither cracked nor whitened when folded in ordinary use.

The thickness of the surface-protective film or sheet, the ink layer and the adhesive layer is not specifically defined, and may be suitably varied depending on the use of the film or sheet.

The surface-protective film or sheet may be subjected to any ordinary secondary working. For example, it may be embossed for controlling its surface gloss.

The adhesive layer is for improving the surface quality of the resin film or sheet of which the surface is printed to form an ink layer thereon, or for facilitating the adhesion of the resin film or sheet to a substrate film or sheet, or to a substrate film or sheet having an ink layer formed thereon, or to the surface of a subject to be protected with the resin film or sheet.

For improving the surface quality of the resin film or sheet, in general, the resin film or sheet may be coated with a primer to form the intended adhesive layer thereon. For this, any known primer is employable. Specific examples of the primer employable herein include epoxy/polyaminoamide, polyester/polyisocyanate, polyurethane, silicone resin, polyvinyl alkyl ether, vinyl chloride/vinyl acetate copolymer, vinyl acetate/ethylene copolymer, (carboxylated) polyacrylate, acrylate/vinyl acetate copolymer, etc. Of those, preferred are polyurethane, epoxy/polyaminoamide, polyester/polyisocyanate, silicone resin, polyvinyl alkyl ether. Especially preferred is polyurethane.

Any other known surface modification is also employable. For example, employable is any of corona-discharging treatment, surface roughening treatment, etc.

For facilitating the adhesion of the film or sheet of the resin composition of the invention to a substrate film or sheet, or to a substrate film or sheet having an ink layer formed thereon, or to the surface of a subject to be protected with the resin film or sheet, employable are any known adhesives of volatile solvent adhesives, chemical reaction adhesives, instantaneous adhesives, hot-melt adhesives and the like of polyurethane, vinyl acetate/ethylene copolymer, (carboxylated) polyacrylate, epoxy resin and the like. Of those, preferred are polyurethane adhesives. For this, any known adhering method is employable. For the purpose of improving the adhesiveness between the adhesive layer and the resin film or sheet, a primer may be applied to the film or sheet before the film or sheet is coated with the adhesive.

For the ink layer, any ink for ordinary plastics is employable. To apply ink to the film or sheet, any known coating method is employable. For example, ink may be directly applied to the film or sheet, but preferably, it is applied thereto via an adhesive layer such as that mentioned above, therebetween. Specific examples of the ink employable herein include solutions or dispersions as prepared by dissolving or dispersing organic or inorganic pigment and resin, such as polyvinyl chloride resin, vinyl chloride/vinyl acetate copolymer resin, polyurethane resin, polyamide resin or the like, in solvent.

The ink layer may be formed on the film or sheet of the resin composition of the invention by transferring an ink layer already formed on a different film, onto the resin film or sheet through known transferring lamination.

For the purpose of improving the discoloration resistance, the weather resistance and the adhesion retentiveness of the ink layer and the adhesive layer noted above, a phenolic stabilizer or an organic phosphate stabilizer such as that mentioned above may be added to the ink layer and the adhesive layer.

In its practical use, the surface-protective film or sheet as produced by forming an adhesive layer and/or an ink layer on one surface of the film or sheet of the flexible polypropylene resin composition of the invention is applied to the surface of a subject to be protected therewith generally in such a manner that the non-coated surface of the resin film or sheet faces outside while the other surface thereof having an ink layer and/or an adhesive layer formed thereon faces inside. The surface-protective film or sheet supported by a substrate film or sheet may be applied to the surface of a subject to be protected therewith in such a manner that the substrate film or sheet faces inside.

The surface-protective film or sheet of the invention, as comprising a flexible polypropylene resin, has good apparent quality and is neither cracked nor whitened when folded in ordinary use. In particular, where the resin composition for the film or sheet comprises a light stabilizer such as that mentioned above, the film or sheet has good weather resistance by itself and has good properties of the flexible polypropylene resin therein. Where a benzotriazole ultraviolet absorbent such as that mentioned above is added to the resin composition for the film or sheet, the discoloration resistance and the weather resistance of the ink layer formed on the film or sheet and also the adhesion retentiveness and the weather resistance of the adhesive layer formed thereon are much improved. In particular, high-molecular weight benzotriazole ultraviolet absorbents are preferred, as effective for improving the adhesion retentiveness between the resin film or sheet and the substrate film or sheet as laminated together via an adhesive therebetween.

In addition, the surface-protective film or sheet of the invention is further effective for protecting the surface of a subject as coated with the film or sheet from being discolored or weathered.

Chlorine-containing ink layers or adhesive layers may have some negative influences on the weather resistance of substrate films or sheets, owing to the chlorine migration into the films or sheets.

EXAMPLES

The invention is described in more detail with reference to the following Examples, which, however, are not intended to restrict the scope of the invention.

Example 1

1. Production of Flexible Polypropylene Resin

[1] Preparation of Magnesium Compound

A glass reactor having a volume of about 6 liters and equipped with a stirrer was fully purged with nitrogen gas, into which were put about 2,430 g of ethanol, 16 g of iodine and 160 g of metal magnesium. These were heated and reacted with stirring under reflux, until hydrogen gas was no more formed in the reaction system, to produce a solid reaction product. The reaction mixture containing the solid product thus produced therein was dried under reduced pressure to obtain a magnesium compound.

[2] Preparation of Solid Catalyst Component (W)

Into a 5-liter glass reactor having been fully purged with nitrogen gas, put were 160 g of the magnesium compound (not ground) obtained in [1], 800 ml of pure heptane, 24 ml of silicon tetrachloride, and 23 ml of diethyl phthalate. Then, the reaction system was kept at 80° C., and 770 ml of titanium tetrachloride was added thereto with stirring, and reacted at 110° C. for 2 hours. The resulting solid component was taken out, and washed with pure heptane at 90° C. To this was added 1,220 ml of titanium tetrachloride, and reacted at 110° C. for 2 hours. Then, this was fully washed with pure heptane to obtain a solid catalyst component (W).

[3] Vapor-Phase Polymerization

Into a 200-liter polymerization reactor, fed were the solid catalyst component (W) obtained in [2] at a rate of 6.0 g/hr, triisobutylaluminium (TIBA) at a rate of 0.2 mols/hr, 1-allyl-3,4-dimethoxybenzene (ADMB) at a rate of 0.006 mols/hr, cyclohexylmethyldimethoxysilane (CHMDMS) at a rate of 0.003 mols/hr, and propylene at a rate of 43 kg/hr. In this, the monomer was polymerized at 70° C. and 28 kg/cm $^2$G. The amount of the polymer thus formed was 30 kg/hr.

The polymer had a limiting viscosity [η] (135° C., in decalin) was 5.04 dl/g.

The boiling n-heptane-insoluble content of the polymer was 88.2% by weight. The boiling n-heptane-insoluble component in the polymer had [η] of 5.42 dl/g, and the boiling n-heptane-soluble component therein had [η] of 2.07 dl/g.

On the other hand, the pentad fraction, rrrr/(1-mmmm)× 100, of the homopolymer as calculated from its $^{13}$C-NMR spectral pattern was 24.2%; the peak melting temperature (Tm) thereof as measured through DSC was 158.7° C.; and the melting enthalpy (ΔH) thereof was 80.7 J/g. No inverted bonding against the head-tail bonding of the propylene units in the polymer was found.

The powdery polymer obtained herein was mixed with 2,5-dimethyl-2,5-di-(t-butylperoxy)-hexane, to which were added an antioxidant, a stabilizer and a chlorine-trapping agent. The resulting mixture was extruded through a 40-mmφ die to obtain pellets having a melt index (MI, 230° C., 2.16 kgf) of 2.5 g/10 min. On the other hand, the polymer was degraded with a peroxide to reduce its molecular weight. There was found no change in the pentad fraction, the peak melting temperature and the melting enthalpy between the original polymer and the degraded, low-molecular weight polymer.

The resin obtained herein had a tensile modulus of elasticity of 500 MPa.

2. Film Formation, Primer and Ink Coating, Evaluation of Film Samples, and Data of Film Samples The flexible propylene resin pellets produced herein were mixed with a hindered amine light stabilizer (HALS) and an ultraviolet absorbent (UVA), as in Tests Nos. 1 to 11 in Table 1, and the resulting mixture was molded through a 40-mmφ T-die extruder (molding temperature: 270° C.) into a film having a thickness of 100 μm. One surface of the film was coated with a primer at a thickness of 2 μm, and ink was applied thereonto at a thickness of 3 μm. Thus were produced surface-protective film samples.

Each sample was set in a sunshine superlong-life weather meter (WEL-SUM-WO Model manufactured by Suga Tester Co., light source: sunshine carbon arc, blackpanel temperature: 83° C., rain cycle: 18 min/120 min) in such a manner that the resin surface of the sample could be exposed to ultraviolet rays, and tested for its weather resistance.

After 1000 hours exposure, the outward appearance of the flexible polypropylene resin film of each sample was visually checked. In addition, each exposed sample was folded at an angle of 180° by hand, and visually checked for cracks, if any.

This is the test of the samples for their outward appearance and strength after UV exposure. Further, the ink layer on each exposed sample was visually checked for discoloration, if any. The test results are shown in Table 1.

From the test results as below, it is known that the addition of HALS to the resin improves the weather resistance of the films. It is also known that the addition of UVA thereto greatly improves the discoloration resistance of the ink layer formed on the films. However, the weather resistance of the films having chlorine-containing ink layer and adhesive layer, if formed thereon, is often not so good.

Example 2

To the flexible propylene resin pellets that had been prepared in Example 1—1, added were a hindered amine light stabilizer (HALS) and an ultraviolet absorbent (UVA) as in Tests Nos. 12 to 27 in Table 2, and the resulting mixture was molded through a 40-mmφ T-die extruder (molding temperature: 270° C.) into films having a thickness of 80 to 100 μm. A 80 μm-thick base film having been produced by molding the flexible propylene resin pellets of Example 1—1 through a 40-mmφ T-die extruder (molding temperature: 270° C.) was laminated onto one surface of each film produced herein with polyurethane adhesive (thickness: 2 μm) as shown in Table 2. Thus were produced surface-protective film samples.

Each sample was set in the same device as in Example 1 in such a manner that the HALS and UVA-containing resin surface could be exposed to ultraviolet rays, and tested for its weather resistance.

After 500 hours exposure, the outward appearance of the flexible polypropylene resin film of each sample in Tests Nos. 12 to 27, to which U rays had been directly applied, was visually checked. In addition, each exposed sample was folded, and visually checked. This is the test of the samples for their outward appearance and folding resistance. Further, the adhesion retentiveness (adhesiveness) of each sample was evaluated on the basis of the easiness or difficulty in peeling each sample. Concretely, for evaluating its adhesiveness on the basis of the easiness or difficulty in peeling it, each sample having been formed by laminating the two films was half-cut with a cutter, and the two films were peeled off by hand whereupon the operator sensually determined the adhesiveness between the two films on the basis of the peeling resistance that the operator had in peeling the two films, and ranked the samples in accordance with the sensual determination. The test results are shown in Table 2.

From the test results as below, it is known that the adhesion retentiveness of the samples, to which was added a high-molecular weight UVA or a high-molecular weight HALS as combined with a low-molecular weight HALS, is good.

The details of HALS, UVA, primer, ink and adhesive used herein as in the Tables, and those of the evaluation criteria referred to in the Tables are mentioned below.

HALS-1:
Bis(1,2,2,6,6-pentamethyl-4-piperidyl) 2-(3,5-di-t-butyl-4-hydroxybenzyl)-2-n-butylmalonate, Tinuvin 144 by Ciba-Geigy, having a molecular weight of 685.

HALS-2:
Poly[{6-(1,1,3,3-tetramethylbutyl)amino-1,3,5-triazine-2,4-diyl}{(2,2,6,6-tetramethyl-4-piperidinyl)imino}hexamethylene{(2,2,6,6-tetramethyl-4-piperidinyl)imino}], Chimassorb 944LD by Ciba-Geigy, having a molecular weight of from 2000 to 3300.

HALS-3:
N,N'-bis(3-aminopropyl)ethylenediamine/2,4-bis[N-butyl-N-(1,2,2,6,6-pentamethyl-4-piperidyl)amino]-6-chloro-1,3,5-triazine condensate, Chimassorb 119FL by Ciba-Geigy, having a molecular weight of at least 2000.

HALS-4:
Bis(2,2,6,6-tetramethyl-4-piperidyl) sebacate, Sanol LS770 by Sankyo, having a molecular weight of 481.

HALS-5:
Bis (N-methyl-2,2,6,6-tetramethyl-4-piperidyl) sebacate, Sanol LS765 by Sankyo, having a molecular weight of 509.

HALS-6:
Bis(1-octyloxy-2,2,6,6-tetramethyl-4-piperidyl) sebacate, Tinuvin 123 by Ciba-Geigy, having a molecular weight of 737.

HALS-7:
Tetrakis(1,2,2,6,6-pentamethyl-4-piperidyl) 1,2,3,4-butane-tetracarboxylate, Adekastab LA52, by Asahi Denka, having a molecular weight of 847.

UVA-1:
2-(3-t-butyl-5-methyl-2-hydroxyphenyl)-5-chlorobenzotriazole, Tinuvin 326 by Ciba-Geigy, having a molecular weight of 316.

UVA-2:
2-(3,5-Di-t-butyl-2-hydroxyphenyl)benzotriazole, Tinuvin 320 by Ciba-Geigy, having a molecular weight of 323.

UVA-3:
2,4-Di-hydroxybenzophenone, Sumisorb 100 by Sumitomo Chemical, having a molecular weight of 214.

UVA-4:
2,4-Di-butylphenyl 3,5-di-t-butyl-4-hydroxybenzoate, Tinuvin 120 by Ciba-Geigy, having a molecular weight of 439.

UVA-5:
2,2'-Methylene-bis[4-(1,1,3,3-tetramethylbutyl)-6-[(2H-benzotriazol-2-yl)phenol]], Adekastab LA31by Asahi Denka, having a molecular weight of 659.

Primer-1:
Vinyl chloride-vinyl acetate copolymer primer.

Primer-2:
Polyester primer.

Primer-3:
Polyurethane primer.

Ink-1:
Vinyl chloride-vinyl acetate copolymer ink

Ink-2:
Polyurethane ink.

Adhesive-A:
Polyurethane adhesive (by Takeda Chemical Industries).

Adhesive-B:
Polyurethane adhesive (by Takeda Chemical Industries, containing increased weather-proofing agent).

<Evaluation Criteria>
1. Film (outward appearance and strength of flexible polypropylene resin film):
Outward Appearance:
Results: Evaluation Criteria:
  B: No cracks found with no problem.
  D: Cracks found. Strength:
Results: Evaluation Criteria:
  B: Neither cracked nor broken.
  D: Cracked and broken.
2. Ink (discoloration resistance of ink was visually checked):
Results: Evaluation Criteria:
  B: Not discolored.
  C: Discolored.
  D: Much discolored.
3. Adhesiveness (adhesion retentiveness to substrate film):
Result: Evaluation Criteria:
  A: Not peeled, or peeled with great force
  B: Peeled with some resistance.
  C: Easily peeled.

TABLE 1

| | Resin | HALS 1 | 2 | 3 | UVA 1 | 2 | 3 | 4 | Primer 1 | 2 | 3 | Ink 1 | 2 |
|---|---|---|---|---|---|---|---|---|---|---|---|---|---|
| Test 1 | 100 | — | 0.5 | — | — | — | — | — | — | — | — | 1 | — | 
| Test 1 | | | | | | | | | | | | | 1 |
| Test 2 | 100 | 0.5 | — | — | 0.5 | — | — | — | 1 | — | — | 1 | — |
| Test 3 | 100 | 0.5 | — | — | 0.5 | — | — | — | — | 1 | — | 1 | — |
| Test 4 | 100 | 0.5 | — | — | 0.5 | — | — | — | — | — | 1 | 1 | — |
| Test 5 | 100 | 0.5 | — | — | 0.5 | — | — | — | — | — | — | 1 | 1 |
| Test 6 | 100 | — | 0.5 | — | 0.3 | — | — | — | — | — | — | 1 | 1 |
| Test 7 | 100 | — | — | 0.5 | 0.3 | — | — | — | — | — | — | 1 | 1 |
| Test 8 | 100 | — | 0.5 | — | — | 0.3 | — | — | — | — | — | 1 | 1 |
| Test 9 | 100 | — | 0.5 | — | — | 0.3 | — | — | — | — | — | 1 | — |
| Test 10 | 100 | — | 0.5 | — | — | — | 0.3 | — | — | — | — | 1 | 1 |
| Test 11 | 100 | — | 0.5 | — | — | — | — | 0.3 | — | — | — | 1 | 1 |
| Comp. Test | 100 | — | — | — | — | — | — | — | — | — | — | — | — |

| | Results | | |
|---|---|---|---|
| | Film | | Ink |
| | Outward Appearance | Strength | Outward Appearance |
| Test 1 | B | B | — |
| Test 2 | B | B | — |
| Test 3 | B | B | — |
| Test 4 | B | B | — |
| Test 5 | B | B | B |
| Test 6 | B | B | B |
| Test 7 | B | B | B |
| Test 8 | B | B | B |
| Test 9 | B | B | B |
| Test 10 | B | B | D |
| Test 11 | B | B | C |
| Comp. Test | D | D | — |

1: Coated. —: Not added or not coated. Unit: parts by weight.

TABLE 2

| | Resin | HALS 4 | 5 | 1 | 6 | 7 | UVA 3 | 2 | 1 | 2 | 5 |
|---|---|---|---|---|---|---|---|---|---|---|---|
| Test 12 | 100 | — | — | 0.1 | — | — | 0.1 | — | — | 0.2 | — |
| Test 13 | 100 | — | — | — | — | — | 0.2 | — | — | 0.2 | — |
| Test 14 | 100 | — | — | 0.2 | — | — | — | — | — | 0.2 | — |
| Test 15 | 100 | — | — | 0.1 | — | — | — | 0.1 | — | 0.2 | — |
| Test 16 | 100 | — | 0.1 | — | — | — | 0.1 | — | — | 0.2 | — |
| Test 17 | 100 | 0.1 | — | — | — | — | 0.1 | — | — | 0.2 | — |
| Test 18 | 100 | — | — | — | — | 0.1 | 0.1 | — | — | 0.2 | — |
| Test 19 | 100 | — | — | — | 0.1 | — | 0.1 | — | — | 0.2 | — |
| Test 20 | 100 | — | — | 0.1 | — | — | 0.1 | — | — | — | 0.2 |
| Test 21 | 100 | — | — | 0.1 | — | — | 0.1 | — | 0.2 | — | — |
| Test 22 | 100 | — | — | — | — | 0.05 | 0.15 | — | — | — | 0.2 |
| Test 23 | 100 | — | — | — | — | 0.3 | 0.15 | — | — | — | 0.2 |
| Test 24 | 100 | — | — | — | — | 0.05 | 0.15 | — | — | — | 0.3 |
| Test 25 | 100 | — | — | — | — | 0.05 | 0.15 | — | — | — | 0.45 |
| Test 26 | 100 | — | — | — | — | 0.05 | 0.15 | — | — | 0.2 | — |
| Test 27 | 100 | — | — | — | — | 0.05 | 0.15 | — | — | 0.45 | — |

| | | | Results | | |
|---|---|---|---|---|---|
| | | | Film | | Adhesivenss |
| | Thickness μm | Adhesive Type | Outward Appearance | Strength | Outward Appearance |
| Test 12 | 100 | B | B | B | C |
| Test 13 | 100 | B | B | B | C |
| Test 14 | 100 | B | B | B | C |
| Test 15 | 100 | B | B | B | C |
| Test 16 | 100 | B | B | B | C |
| Test 17 | 100 | B | B | B | C |
| Test 18 | 100 | B | B | B | A |
| Test 19 | 100 | B | B | B | A |
| Test 20 | 100 | B | B | B | A |
| Test 21 | 100 | B | B | B | C |
| Test 22 | 80 | A | B | B | B |
| Test 23 | 80 | A | B | B | B |
| Test 24 | 80 | A | B | B | A |
| Test 25 | 80 | A | B | B | A |
| Test 26 | 80 | A | B | B | B |
| Test 27 | 80 | A | B | B | C |

INDUSTRIAL APPLICABILITY

Moldings such as films or sheets of the HALS-containing flexible polypropylene resin composition of the invention have good weather resistance. In addition, when a benzotriazole UVA is added to the composition in the manner mentioned above, the discoloration resistance of the ink layer formed on the surface of the moldings and even the adhesion retentiveness of the adhesive layer formed thereon are improved. In particular, when a high-molecular weight benzotriazole UVA is added to the composition in the manner mentioned above, the adhesion retentiveness of the film or sheet of the composition to a substrate film or sheet as bonded to the former via an adhesive is much improved.

What is claimed is:

1. A flexible polypropylene resin composition comprising 100 parts by weight of a flexible polypropylene resin having (a) peak melting temperature (Tm) of 150° C. or above as measured through differential scanning calorimetry (DSC) and (b) a tensile modulus of elasticity of from 200 to 700 MPa, from 0.05 to 5 parts by weight of a hindered amine light stabilizer, and from 0.05 to 5 parts by weight of a benzotriazole ultraviolet absorbent relative to 100 parts by weight of the flexible polypropylene resin, wherein the flexible polypropylene resin comprises (A) from 20 to 100% by weight of a propylene homopolymer having (c) a pentad fraction, $rrrr/(1-mmmm) \times 100$, as measured through isotopic carbon nuclear magnetic resonance spectrometry ($^{13}$C-NMR) of from 20 to 60%, and (d) a melting enthalpy ($\Delta H$) as measured through differential scanning calorimetry (DSC) of from 10 to 100 J/g, and/or a propylene copolymer containing at most 4% by weight of other olefin units and having the physical data of (c) and (d), and (B) from 0 to 80% by weight of a propylene copolymer containing from 10 to 80% by weight of non-propylene olefin units, and wherein the benzotriazole ultraviolet absorbent is a compound having a molecular weight of not smaller than 400.

2. A film or sheet shaped from the flexible polypropylene resin composition of claim 1.

3. A surface-protective film or sheet produced by forming at least an adhesive layer on one surface of the film or sheet of claim 2.

4. A surface-protective film or sheet produced by forming at least an ink layer on one surface of the film or sheet of claim 2.

5. A surface-protective film or sheet produced by forming at least a substrate film or sheet on one surface of the film or sheet of claim 2.

6. The flexible polypropylene resin composition as claimed in claim 1, wherein said component (A) has a boiling n-heptane-insoluble content of from 40 to 95% by weight.

7. The flexible polypropylene resin composition as claimed in claim 1, wherein said non-propylene olefin units of component (B) comprise ethylene, 1-butene, 1-pentene, 4-methyl-1-pentene, 1-hexene, 1-heptene, 1-octene, 1-nonene, 1-decene, butadiene, dicyclopentadiene or tricyclopentadiene or a mixture thereof.

8. The flexible polypropylene resin composition as claimed in claim 1, wherein component (B) is present in an amount of not more than 70% by weight.

9. The flexible polypropylene resin composition as claimed in claim 1, wherein component (A) has a melt index (MI) of between 0.5 and 200 g/10 min.

10. The flexible polypropylene resin composition as claimed in claim 1, wherein component (B) has a limiting viscosity of between 0.1 and 10.

* * * * *